Figure 1:
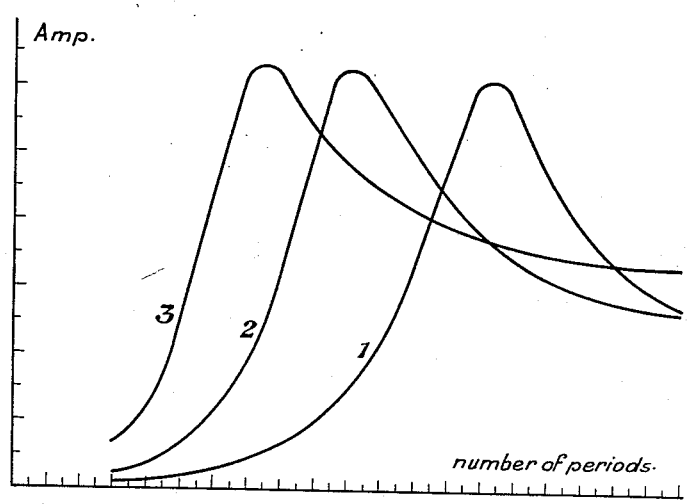

A. KAZENMAIER.
ELECTRICAL SPEED INDICATOR.
APPLICATION FILED MAR. 12, 1917.

1,312,992.

Patented Aug. 12, 1919.

INVENTOR
August Kazenmaier

BY ATTORNEYS

UNITED STATES PATENT OFFICE.

AUGUST KAZENMAIER, OF STUTTGART, GERMANY, ASSIGNOR, BY MESNE ASSIGNMENTS, TO AMERICAN BOSCH MAGNETO CORPORATION, OF NEW YORK, N. Y., A CORPORATION OF NEW YORK.

ELECTRICAL SPEED-INDICATOR.

1,312,992.        Specification of Letters Patent.       Patented Aug. 12, 1919.

Application filed March 12, 1917. Serial No. 154,377.

*To all whom it may concern:*

Be it known that I, AUGUST KAZENMAIER, engineer, a subject of the German Emperor, residing at Stuttgart, 9 Mühlrain, Germany, have invented certain new and useful Improvements in Electrical Speed-Indicators; and I do hereby declare the following to be a full clear, and exact description of the invention, such as will enable others skilled in the art to which it appertains to make and use the same.

In many cases it is desirable to be able to read the speed of revolution of an element of a machine with great precision on a pointer instrument placed at any suitable place, even if this is only possible for a limited range of measurement. In known arrangements the number of revolutions are determined by coupling a dynamo with the revolving machine element and by using the current generated by the dynamo as a measure of the speed. Small dynamos of the simplest kind are used for this purpose. Good results have been obtained with alternating current dynamos equipped with permanent steel magnets and fixed armatures, because in such machines the effect obtained is independent of resistance introduced by the brushes of contiuous current machines and because a constant magnetic field is available without employing the source of current required with alternators with electromagnetic fields. Machines with permanent magnets connected to voltmeters, on which the pressure generated is read, are now used as distant control speed indicators *i. e.* as indicators which enable the readings to be taken at a place remote from the revolving element. But with this arrangement a satisfactory calibration of the voltmeter as a speed indicator is in many cases not practicable, because the magnitude of its deflection is dependent on the reaction of the armature field caused by the current that flows through the instrument. With the usual speed of revolution, the decrease of the armature field resulting from this reaction might be so appreciable in small machines that the measuring instrument will not indicate increases of speed beyond a certain limit.

In order to be independent of armature reaction and to obtain indications that change in the desired range of measurement in approximately the same proportion as the speed of revolution of the dynamo, I employ a condenser in the alternating current circuit and an ammeter for the measurements. In an alternating current circuit of this kind including inductance and capacity, the amplitude of the current depends on the frequency, which depends in turn on the speed of the current generator, the frequency being in direct proportion to the speed. At low speed the capacity determines almost by itself the amplitude of the current, the ohmic resistance being practically negligible. When the speed increases the counteracting inductance becomes more and more marked, until the capacity and inductance balance and neutralize each other. The conditions will now be such as if the current were opposed only by the ohmic resistance of the circuit. At a constant electromotive force the amplitude of the current now reaches its maximum. An electromotive force rising with the speed displaces the curve somewhat, so that the highest value is reached later, but this does not change the character of the curve. If the speed is increased further the inductance will prevail over the capacity, and a decrease of the amplitude of the current takes place. This property of a condenser circuit, which is called resonance, and which is characterized by the fact that the amplitude of the current reaches its highest value at a certain number of alternations or periodicity, and increases from a certain point below the maximum to its highest value almost in simple proportion to the increase of periodicity, is utilized in this invention for influencing a measuring instrument in the desired manner, within the desired range of measurement.

It will be understood that, all other conditions being equal, the maximum amplitude of the current may be caused to occur any place in the period by changing the capacity of the condenser.

Figure 2:
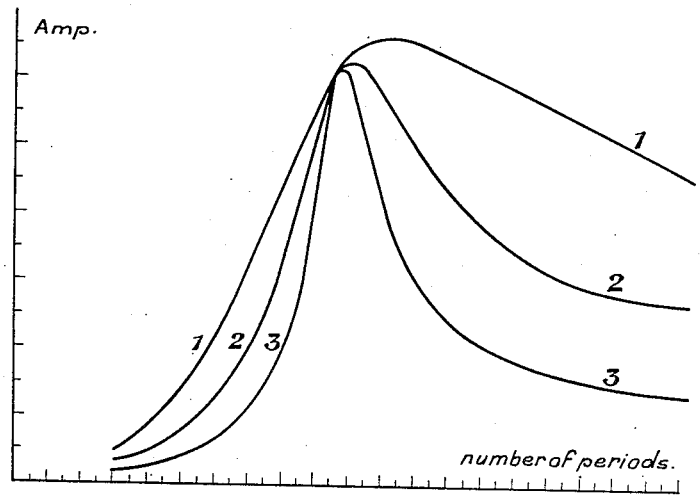

In the accompanying illustrative drawings, Figure 1 represents three curves showing the relation between the current amplitude and the frequency with the capacity of a condenser altered in the ratio of 1 to 1, 1 to 2 and 1 to 4, all other conditions in the circuit remaining the same; Fig. 2 represents three curves showing the relation between current amplitude and frequency in a circuit in which the inductance exists in the ratio of 1 to 1, 1 to 2 and 1 to 4, whereas the capacity is altered in the inverse ratio of 1 to 4, 1 to 2 and 1 to 1; and Fig. 3 shows a diagram of the preferred form of circuit in accordance with the invention.

As may be seen from Figs. 1 and 2, the current values just preceding the maximum value in each curve form a substantially straight line. With a measuring instrument whose range of indication lies within the limits determined by this straight gradient or by a part of it, and the pointer deflection of which depends within this range upon the current amplitude, the speed may be ascertained within the limits of the said range of indication. With steeper gradients of current amplitude, the accuracy of the frequency indication is increased but the range of indication is decreased, and conversely, with gradients less steep, the accuracy of the indications is decreased but the range increased. The steepness of the gradient depends upon the time constant $\frac{L}{r}$ of the circuit, L representing the coefficient of self-induction and $r$ the ohmic resistance. If the coefficient of self-induction L is changed, the steepness of the gradient is changed; but if, at the same time, the capacity K of the circuit is changed in inverse proportion so that LK remains constant, the frequency at which the circuit becomes resonant is not changed.

Figure 3:
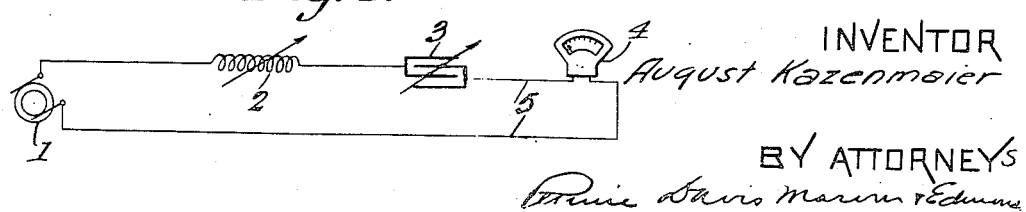

Referring now to Fig. 3, 1 represents an alternating current generator adapted to be connected in any suitable way to the element whose speed is to be determined. The circuit connected to the generator contains an adjustable inductance 2, an adjustable condenser 3, and an alternating current ammeter 4 connected in series by wires 5.

By suitably adjusting the capacity of the condenser 3 and the self-induction of the inductance 2, the range of measurement within the straight line gradient preceding the maximum point of resonance of the current in the circuit may be displaced within any desired limits. In making a measuring instrument the limits chosen will be those in which the speed is to be determined. In driving a machine for example these limits will be the highest and lowest permissible speed.

Instead of connecting the condenser in series with the other elements of the circuit, it may be connected in any other suitable way, the essential idea being to produce a resonance effect of the current passing through the measuring instrument.

I claim:

1. The method of measuring the speed of a revolving element by means of an alternating current generator driven thereby, which consists in utilizing capacity and inductance in the circuit of the generator in such manner as to produce over the range of speed to be measured a steep gradient of current flow preceding the maximum current value due to resonance, and measuring the speed of the revolving element in terms of the value of the current flowing in the circuit.

2. The method of measuring the speed of a revolving element by means of an alternating current generator driven thereby, which consists in utilizing capacity and inductance in the circuit of the generator and adjusting the inductance in such manner as to produce over the range of speed to be measured a steep gradient of current flow preceding the miximum current value due to resonance, and measuring the speed of the revolving element in terms of the value of the current flowing in the circuit.

3. The method of measuring the speed of a revolving element by means of an alternating current generator driven thereby, which consists in utilizing capacity and inductance in the circuit of the generator and adjusting the capacity in such manner as to produce over the range of speed to be measured a steep gradient of current flow preceding the maximum current value due to resonance, and measuring the speed of the revolving element in terms of the value of the current flowing in the circuit.

4. The method of measuring the speed of a revolving element by means of an alternating current generator driven thereby, which consists in utilizing capacity and inductance in the circuit of the generator and adjusting the capacity and inductance in such manner as to produce over the range of speed to be measured a steep gradient of current flow preceding the maximum current value due to resonance, and measuring the speed of the revolving element in terms of the value of the current flowing in the circuit.

In testimony whereof I affix my signature in presence of two witnesses.

AUGUST KAZENMAIER.

Witnesses:
  PAUL WOLFAST,
  ADOLF LEBHERS.